Aug. 9, 1960     C. M. ASHLEY     2,948,620
METHOD AND APPARATUS FOR BLANCHING FOOD PRODUCTS
Original Filed Nov. 14, 1951
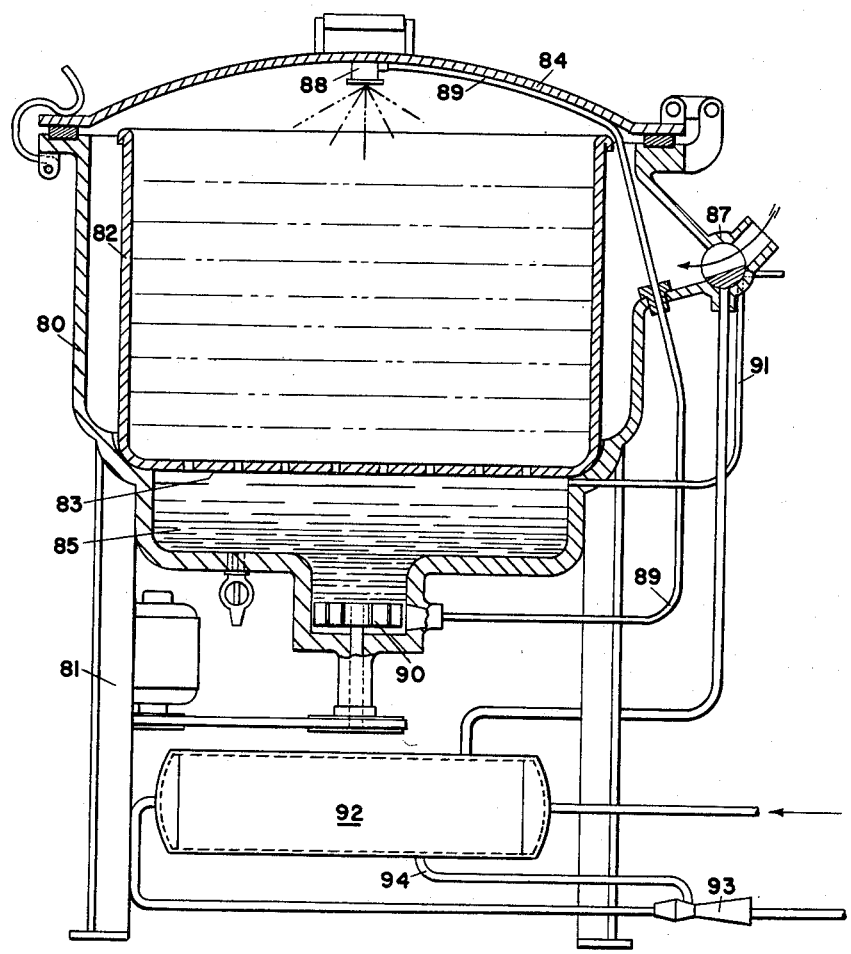
INVENTOR.
CARLYLE MARTIN ASHLEY
BY
*Herman Seid*
ATTORNEY.

United States Patent Office 2,948,620
Patented Aug. 9, 1960

2,948,620

METHOD AND APPARATUS FOR BLANCHING FOOD PRODUCTS

Carlyle Martin Ashley, Fayetteville, N.Y., assignor to Carrier Corporation, Syracuse, N.Y., a corporation of Delaware Original application Nov. 14, 1951, Ser. No. 256,315, now Patent No. 2,870,020, dated Jan. 20, 1959. Divided and this application June 2, 1958, Ser. No. 739,194

5 Claims. (Cl. 99—100)

This application is a division of copending application, Serial No. 256,315, filed November 14, 1951, entitled "Method and Apparatus for Blanching Food Products," now Patent No. 2,870,020. This invention relates to a method of blanching or scalding and subsequent cooling of food products and equipment therefor and, more particularly, to a method of steam blanching food products in which dissolved solids are returned to the food product preferably during the cooling operation and to apparatus for steam blanching food products, collecting dissolved solids, and returning the dissolved solids to the food product during the cooling operation.

In food freezing, either domestic or commercial, it is essential to blanch or scald the food product, particularly vegetables, before the freezing operation to destroy or render inactive the enzymes to prevent the appearance and taste of the frozen product being deleteriously affected. While blanching is conducted to destroy the principal enzymes, overblanching should be avoided.

Blanching has generally been conducted by means of boiling water or steam. Water blanching is not satisfactory for it results in a decrease in the nutritive value of the food product since a large proportion of the juices and dissolved solids such as vitamins and minerals are wasted away. It may result in a relative loss in weight in the final product which is extremely serious in commerical applications since the product is sold by weight. The water supply too may affect the texture, appearance, odor, flavor, nutritive value or storage life of the product since it may contain materials injurious to any or all of such factors; to avoid damage to the food product from the water supply, it is customary in larger freezing plants to provide expensive water treatment equipment.

In the steam blanching processes as heretofore conducted, the solids dissolved in the condensate are not returned to the product but are wasted. A further disadvantage rests in the fact that in the processes used heretofore the product is washed with water when it is in a soft, porous condition to cool the same with resulting loss of a considerable additional percentage of solids.

The chief object of the present invention is to eliminate the present disadvantages of steam blanching and water cooling.

An object of the present invention is to provide a method of steam blanching in which nutrients are returned to the food product prior to freezing. The term "nutrients" is used herein to designate dissolved solids such as minerals, vitamins, proteins, carbohydrates, etc.

A further object is to provide a method of steam blanching in which nutrients are returned to the food product during the cooling operation.

A still further object is to provide a method of steam blanching and cooling in which condensate and juices given off by the food product during the steaming operation are evaporated under vacuum while in contact with the food product to cool the same, to restore the original weight, and to return the dissolved solids to the food product.

A still further object is to provide a method of blanching in which steam is introduced and air and other non-condensible gases are removed in such manner that a minimum of oxygen is in contact with the heated food product to cause oxidation.

A still further object is to prevent the reintroduction of bacteria to the heat sterilized food product by contact with non-sterile water.

A still further object is to provide apparatus for steam blanching and subsequent cooling of food products adapted for commercial use.

A still further object is to provide blanching apparatus in which condensate is removed from the food product at the end of the heating operation.

A still further object is to provide apparatus to blanch a food product and to cool the same while returning dissolved solids and juices thereto to restore its original weight, flavor and appearance. Other objects of the invention will be readily perceived from the following description.

This invention relates to a method of blanching and cooling food products in which the steps consist in placing a heated vapor in contact with the food product to heat the same, collecting nutrients given off by the food product during the heating operation, cooling the heated food product and distributing the collected nutrients over the food product to restore substantially the original nutrients, including vitamins and minerals.

This invention further relates to a method of blanching and cooling food products in which the steps consist in circulating a heated vapor over a food product to heat the same while condensing at least a portion of the vapor upon the product, discontinuing the supply of heated vapor, and then creating a vacuum about the food product to evaporate liquid present on the surface of the food product to cool the same.

This invention further relates to apparatus for blanching and cooling food products which comprises, in combination, means for supplying a heated vapor over the food product to heat the same thereby condensing at least a portion of the vapor, means for collecting at least a portion of the nutrients given off by the food product when it is contacted by the vapor, and means for distributing at least a portion of the collected nutrients over the food product to restore a substantial portion of the original nutrient content.

The attached drawing illustrates a preferred embodiment of the invention, in which the single figure is a sectional view of a blanching and cooling device for commercial use.

The device shown in the figure consists of an outer vessel 80 mounted on a suitable base 81 and containing an inner vessel 82 provided with a perforated bottom member 83. A cover 84 is securely clamped to vessel 80 to seal the same during the blanching and cooling operations. A sump 85 is provided in the bottom of vessel 80. Steam is admitted to vessel 80 through three-way valve 87 in such manner that the steam is forced to flow upward in vessel 80 and downward in vessel 82 over the food product. A purge line 91 is connected to vessel 80, such line being opened or closed by movement of valve 87 so that when steam is admitted to vessel 80, the vessel will be purged of non-condensible gases. Valve 87 is connected to a condenser 92 to permit pressure to be reduced in vessel 82, thereby flashing some portion of the liquid therein to cool the product. The usual water ejector 93 is connected to a condenser purge line 94 to purge non-condensible gases from the condenser. Some portion of the vapor condenses on the surfaces of the food product in vessel 82; condensate flows through the perforations in bottom plate 83 into sump 85. Spray nozzles 88 are provided in the top of the vessel and serve to distribute condensate over the surfaces of the food product in the vessel during the cooling operation. The nozzles 88 are connected by line 89 to a pump 90 which forwards condensate from sump 85 to the nozzle 88 for distribution over the food product in vessel 82.

Considering the operation of the device shown in Figure 1, steam is admitted into vessel 80, the steam flowing upward in vessel 80 and downward in vessel 82 over the food product therein. At the same time, the purge mechanism serves to withdraw non-condensible gases from vessel 82. Some portion of the vapor condenses and collects in sump 85. After the product has been heated for a sufficient period of time, valve 87 is actuated to discontinue supply of steam to vessel 80 and to discontinue operation of the purge. Pressure is reduced in vessels 80, 82 by means of the condenser 92 thereby evaporating some portion of the liquid present on the surfaces of the food product to cool the food product. Pump 90 is actuated to forward condensate in sump 85 through line 89 to nozzles 88 which spray the condensate over the surfaces of the food product in vessel 82 to rewet the same.

In normal processing of food to be frozen, according to the present invention, it is customary for food to gain in weight by absorption of water during the blanching and cooling process even though a substantial amount of nutrients are lost in condensate and cooling water. With this process, it is possible to produce a gain in weight without corresponding loss of nutrients. Rewetting the food product by means of the condensate restores the original juices and dissolved solids to the food product and tends to increase the weight beyond the original weight of the food product due to additional absorption in the softened food, particularly when the vacuum is broken by an excess of juices on the food product so that juices rather than air are absorbed by the food product. This is a particularly important feature in commercial blanching since frozen food products are sold by weight. The present blanching and cooling equipment and method of operation permit the reflection of the saving of nutrient losses in the higher total weight compared to former processes.

The present invention provides a simple, ready, economical method of blanching food products and cooling the same which may be practiced in commercial blanching operations. The method provided by my invention assures that juices and dissolved solids are returned to the food product before freezing and restores substantially the initial weight of the product, which is of particular value in commercial operations.

It will be appreciated if the food product is heated through the same range as it is cooled, substantially no change in weight of the food product will occur. The food will absorb substantially all of the juices since heating followed by cooling increases the absorptive capacity.

While I have described a preferred embodiment of the invention, it will be understood the invention is not limited thereto since it may be otherwise embodied within the scope of the following claims.

I claim:

1. In a method for blanching food products, the steps which consist in placing the food product in an inner vessel, supplying heated vapor over the food product to heat the same thereby condensing at least a portion of the vapor, purging the inner vessel of non-condensible gases, discontinuing the supply of heated vapor to the food product, collecting condensate and nutrients in the sump of an outer vessel, cooling the food product, passing the condensate and nutrients from the sump to at least one spray member, and spraying the condensate and nutrients over the food product substantially restoring the dissolved nutrients to the food product.

2. In apparatus for processing food products, the combination of an outer vessel having a sump for condensate in the bottom thereof, an inner vessel adapted to contain a food product to be blanched, means for supplying heated vapor over the food product to heat the same thereby condensing at least a portion of the vapor, means for discontinuing supply of heated vapor to the food product, means for cooling the food product by evaporation of water therefrom, and means for distributing condensate over the food product to restore the dissolved nutrients.

3. In apparatus for processing food products, the combination of an outer vessel having a sump for condensate in the bottom thereof, an inner vessel adapted to contain a food product to be processed, means for supplying heated vapor over the food product to heat the same thereby condensing at least a portion of the vapor, means to purge the inner vessel of non-condensible gases, means for discontinuing supply of heated vapor to the food product, spray members for distributing condensate over the food product, a line connecting the spray members and the sump, and a pump in said line for supplying the condensate to the spray.

4. In apparatus for processing food products, the combination of an outer vessel having a sump for condensate, an inner vessel adapted to contain a food product to be processed, means for supplying heated vapor over the food product to heat the same thereby condensing at least a portion of the vapor, means to purge the inner vessel of non-condensible gases, means for discontinuing supply of heated vapor to the food product, means for passing the condensed vapor from said sump and distributing it over the food product to return condensate and nutrients dissolved in said condensate to said food product, and means for breaking the vacuum in the inner vessel while the food product is submerged in liquid to control an increase in weight of the product.

5. In apparatus for processing food products, the combination of a vessel having a sump for condensate, means for supplying heated vapor over a food product in the vessel to heat the same thereby condensing at least a portion of the vapor, means to purge the vessel of non-condensible gases, means for discontinuing supply of heated vapor to the food product, means for passing the condensed vapor to said sump, means for passing the condensed vapor from said sump and distributing it over the food product to return condensate and nutrients dissolved in said condensate to said food product, and means for breaking the vacuum in the vessel while the food product is submerged in liquid to control an increase in weight of the product.

References Cited in the file of this patent

UNITED STATES PATENTS

| | | |
|---|---|---|
| 959,448 | Baxter | May 31, 1910 |
| 1,720,491 | Parker | July 9, 1929 |
| 2,355,798 | Guthier | Aug. 15, 1944 |
| 2,373,521 | Wigelsworth | Apr. 10, 1945 |
| 2,403,871 | McBean | July 9, 1946 |
| 2,418,519 | McBeth | Apr. 8, 1947 |
| 2,515,879 | Korn | July 18, 1950 |
| 2,522,513 | Hemmeter | Sept. 19, 1950 |
| 2,581,484 | Helgerud | Jan. 8, 1952 |
| 2,692,200 | Olson | Oct. 19, 1954 |
| 2,870,020 | Ashley | Jan. 20, 1959 |

UNITED STATES PATENT OFFICE

CERTIFICATION OF CORRECTION

Patent No. 2,948,620                                                  August 9, 1960

Carlyle Martin Ashley

It is hereby certified that error appears in the above numbered patent requiring correction and that the said Letters Patent should read as corrected below.

Column 2, line 54, strike out "inner vessel 82 provided with a perforated bottom mem-" and insert the same after "an" in line 52, same column.

Signed and sealed this 2nd day of May 1961.

(SEAL)
Attest:

ERNEST W. SWIDER                                        DAVID L. LADD
Attesting Officer                                              Commissioner of Patents